United States Patent
Sun et al.

(10) Patent No.: US 10,962,419 B2
(45) Date of Patent: Mar. 30, 2021

(54) METHOD FOR TESTING A TIRE BY INTERFEROMETRY

(71) Applicant: Carl Zeiss Optotechnik GmbH, Neubeuern (DE)

(72) Inventors: Junli Sun, Munich (DE); Xu Sun, Beijing (CN)

(73) Assignee: Carl Zeiss Optotechnik GmbH, Neubeuern (DE)

( * ) Notice: Subject to any disclaimer, the term of this patent is extended or adjusted under 35 U.S.C. 154(b) by 58 days.

(21) Appl. No.: 16/379,771

(22) Filed: Apr. 9, 2019

(65) Prior Publication Data

US 2020/0326239 A1    Oct. 15, 2020

(51) Int. Cl.
*G01J 9/02* (2006.01)
*G01B 11/16* (2006.01)
*G01M 17/02* (2006.01)

(52) U.S. Cl.
CPC .......... *G01J 9/0215* (2013.01); *G01B 11/162* (2013.01); *G01M 17/027* (2013.01)

(58) Field of Classification Search
CPC .. G01B 11/162; G01B 11/161; G01M 17/027; G01J 9/0215
See application file for complete search history.

(56) References Cited

U.S. PATENT DOCUMENTS

| | | | |
|---|---|---|---|
| 5,361,312 A | 11/1994 | Kuchel | |
| 6,246,483 B1 * | 6/2001 | Smith | G01B 11/162 356/35.5 |
| 6,417,916 B1 * | 7/2002 | Dengler | G01B 11/161 324/244.1 |
| 6,590,668 B1 | 7/2003 | Huber et al. | |

(Continued)

FOREIGN PATENT DOCUMENTS

| DE | 10101057 A1 | 6/2002 |
|---|---|---|
| DE | 102004050355 A1 | 4/2006 |

(Continued)

OTHER PUBLICATIONS

Sun J. "3-Dimensionale Verformungsmessung mittels 3D-Phasenmessung". In: Waidelich W. (eds) Laser in der Technik / Laser in Engineering. (1994), Springer, Berlin, Heidelberg (Germany) and English language translation thereof.

(Continued)

*Primary Examiner* — Michael A Lyons
(74) *Attorney, Agent, or Firm* — Falk Ewers; Ewers IP Law PLLC

(57) ABSTRACT

A method for testing a tire by interferometry in a pressure chamber of a tire testing device includes capturing phase images at different pressures in the pressure chamber, generating partial phase difference images between successive phase images, and summing the partial phase difference images to form an overall phase difference image. The pressure in the pressure chamber is changed in a first direction during a first measurement phase and the pressure is changed in the opposite direction during a second measurement phase, wherein at least one partial phase difference image from the first measurement phase and at least one partial phase difference image from the second measurement phase are included in the summation.

15 Claims, 4 Drawing Sheets

(56) References Cited

U.S. PATENT DOCUMENTS

| | | | |
|---|---|---|---|
| 2002/0135751 A1 | 9/2002 | Steinbichler et al. | |
| 2006/0083347 A1 | 4/2006 | Nosekabel et al. | |
| 2007/0121121 A1* | 5/2007 | Wilhelm | G01B 9/02087 |
| | | | 356/511 |
| 2014/0373614 A1* | 12/2014 | Steinbichler | G01M 17/027 |
| | | | 73/146 |

FOREIGN PATENT DOCUMENTS

| | | | | |
|---|---|---|---|---|
| DE | 19856400 B4 | 4/2009 | | |
| EP | 455218 B1 | 1/1995 | | |
| EP | 3521796 A1 * | 8/2019 | | G01M 17/027 |
| GB | 2340223 A | 2/2000 | | |

OTHER PUBLICATIONS

P. Menner, "Zerstörungsfreie Prüfung von modernen Werkstoffen mit dynamischen Shearografie-Verfahren", Dissertation, (2013) Institut für Kunststofflechnik (IKT) der Universität Stuttgart, (Germany) and partial English language translation thereof.

European Search Report dated Jun. 28, 2019 of European counterpart application No. EP 19155003.7 and English language translation.

* cited by examiner

METHOD FOR TESTING A TIRE BY INTERFEROMETRY

TECHNICAL FIELD

The present disclosure relates to a method for testing a tire by interferometry in a pressure chamber of a tire testing device, and a corresponding tire testing device. The present disclosure further relates to a testing method based on shearography.

BACKGROUND

Using methods for testing a tire by interferometry in a pressure chamber, it is possible to identify defects, such as air inclusions, lying in the interior of the tire. To this end, the pressure in the pressure chamber of the tire testing device is changed and the deformation of the tire generated by the pressure change is measured by interferometry. Phase images of the surface of the tire to be tested are captured at at least two different pressure states and a phase difference image is formed from the phase images, said phase difference image showing the deformation of the tire.

The interferometric test can be a holographic test or a shearographic test. However, use is typically made of shearography as it has the decisive advantage over holography that it can also be used in industrial conditions and in industrial surroundings.

However, two substantial interfering factors still exist when testing tires by interferometry, even when using shearography: This is, inter alia, a whole-body deformation of the tire during the test, caused by a preceding deformation, a local deformation of the tire during the test, caused by a preceding spatial restricted deformation, and vibrations of the tire during the test. The whole-body deformation of the tire is usually based on deformations of the tire which were generated, for example, by introducing the tire into the tire testing device and the relaxation of the tire back into its initial state, occurring during the test. Local deformations of the tire are also usually based on preceding local deformations, for example in the form of pressure points, which relax during the test. Vibrations of the tire can be excited by very different effects, for example by air flows when changing the pressure or external vibration stimulators.

FIG. 1 shows a first measurement log known from the prior art. Here, negative pressure is generated initially during a first phase and the negative pressure then is released again during a second phase by quick aeration of the pressure chamber. A first phase image $B_0$ is captured at maximum negative pressure and a second phase image $B_1$ is captured upon return to the initial pressure after releasing the negative pressure. Then, a phase difference image $D=B_1-B_0$ is generated from the two phase images $B_0$ and $B_1$. This procedure is relatively insensitive in relation to vibrations of the tire. However, whole-body deformations have a very problematic effect here. In particular, these may be substantially larger than the actual deformations from defects of the tire to be examined and/or these may lead to decoherence between the phase images.

Therefore, the document DE 10101057 A1 describes a further method for testing tires by shearography, in which a sequence of phase images of the object is recorded during the deformation of the tire. Thereupon, a partial phase difference image is generated from respectively two successive phase images and the individual partial phase difference images are summed to form an overall phase difference image. An exemplary embodiment of such a method is shown in FIG. 2. Here, a sequence of phase images $B_0$ to $B_6$ is captured while the negative pressure in the pressure chamber of the tire testing device is increased. In each case, a partial phase difference image $D_i=B_{i+1}-B_i$ is determined between adjacent phase images $B_i$ and $B_{i+1}$, and then all partial phase difference images $D_i$ are summed to form an overall phase difference image.

As a result of summing a plurality of phase difference images, the measurement method is relatively insensitive to whole-body deformations. In particular, the coherence between adjacent phase images is maintained. Furthermore, the whole-body deformation can be eliminated from the overall phase difference image. However, the interferences caused by vibrations are amplified during this procedure. As a result, the tire testing devices become more susceptible to errors, the overall phase difference images become noisy and the test times are increased.

SUMMARY

It is an object of the present disclosure to provide an improved method for testing a tire by interferometry, and a corresponding tire testing device.

The present disclosure includes a method for testing a tire by interferometry in a pressure chamber of a tire testing device, including the steps of:
 capturing phase images at different pressures in the pressure chamber;
 generating partial phase difference images between successive phase images, and
 summing the partial phase difference images to form an overall phase difference image.

Typically, the phase images are generated by a shearographic measurement. According to an aspect of the disclosure, the pressure in the pressure chamber is changed in a first direction during a first measurement phase and there is a change in the pressure in the opposite direction during a second measurement phase, wherein at least one partial phase difference image from the first measurement phase and at least one partial phase difference image from the second measurement phase are included in the summation. Therefore, if the absolute pressure in the pressure chamber is reduced during the first measurement phase, it is increased during the second measurement phase, and vice versa.

Since, when proceeding, e.g., from atmospheric pressure, two phases with an opposite pressure profile are necessary in any case to be able to remove the tire at atmospheric pressure again, the procedure according to an aspect of the disclosure is advantageous in that both phases can also be used for measurement purposes. By contrast, one phase remains unused in prior art. Furthermore, the inventors of the present disclosure identified that not only is it possible to use both phases as measurement phases but that, moreover, partial phase difference images from both the first measurement phase and the second measurement phase can be included in the overall phase difference image. Since, according to an aspect of the disclosure, this means that two measurement phases with opposite changes in pressure are included in the overall phase difference image, there is a corresponding increase in the change in pressure effectively considered for creating the overall phase difference image. Hence, there is an increase in the quality of the tire test in the case of the same change in pressure since faults emerge more clearly. Alternatively, the change in pressure can be reduced in relation to the prior art with the quality remaining unchanged. This has significant advantages in terms of costs since the tire testing device only still need be designed for a smaller pressure. Moreover, the measurement time is shortened and the problems with vibrations are reduced.

In an exemplary embodiment of the present disclosure, provision is made for the partial phase difference image or the partial phase difference images from the second measurement phase to be included in the summation with an opposite sign. As a result, it is possible to take account of the opposite change in pressure during the second measurement phase in relation to the first measurement phase and hence to take account of the inverse deformation of the tire.

The procedure according to an aspect of the disclosure has the further advantage that interfering influences resulting from a whole-body deformation, from local deformations such as pressure points and from vibrations are reduced. Usually, these interfering influences have approximately the same behavior over both measurement phases—unlike the deformation generated by the opposite change in pressure on account of faults in the tire. However, since the partial phase difference images from the second measurement phase are included with the opposite sign in the summation, the interfering influences from the second measurement phase therefore at least partly cancel the interfering influences from the first measurement phase.

In an exemplary embodiment of the present disclosure, provision is made for at least two partial phase difference images to be determined, and typically included in the summation, during the first measurement phase and/or the second measurement phase. According to an aspect of the disclosure, there therefore continues to be a summation over a plurality of partial phase difference images even within the individual measurement phase. As a result, it is nevertheless possible to obtain a high quality of the test despite relatively large overall deformations.

Typically, the time duration of the second measurement phase is at least 50% of the time duration of the first measurement phase. This ensures an at least partial cancellation of the interfering influences from the first measurement phase and second measurement phase. The measurement time duration of a measurement phase is typically determined as the time interval between the generation of the first phase image included in a partial phase difference image of this measurement phase and the last phase image included in a partial phase difference image of this measurement phase. Typically, the time duration of the second measurement phase is at least 90% of the time duration of the first measurement phase. By way of example, the second measurement phase may have exactly the same time duration as the first measurement phase.

However, since the deformations of the tire on account of interfering influences tend to reduce over time, the second measurement phase may also have a greater time duration than the first measurement phase. By way of example, the time duration of the second measurement phase may be at least 110% of the time duration of the first measurement phase.

Typically, the time interval between the generation of successive phase images over the first measurement phase and second measurement phase varies by at most 20%, typically by at most 10% of the shortest time interval. Particularly typically, the time interval between the generation of successive phase images over the first measurement phase and second measurement phase is the same for all phase images. As a result, the influence of vibrations on the overall phase difference image can be reduced since interferences from the first measurement phase and the second measurement phase at least partly cancel one another.

Alternatively, the time interval between the generating of successive phase images over the first measurement phase and second measurement phase may vary, in particular may vary in the same way and/or in a statistical manner. This too can reduce the influence of vibrations on the overall phase difference image.

By way of example, a time interval of between 0.01 s and 1 s, more typically between 0.05 and 0.5 s, can be selected between the generating of successive phase images. By way of example, each frame or each $n^{th}$ frame from the video recording rate of the sensor can be used as a measurement point, where n typically lies between 2 and 10.

In an exemplary embodiment of the present disclosure, provision is made for the same pressure to prevail in the pressure chamber during the first generating of a phase image during the first phase and during the last generating of a phase image during the second phase. In particular, the initial state of the first phase may be atmospheric pressure and there may be a return to atmospheric pressure during the second phase such that loading the tire testing device with the tire prior to the first phase and removing the tire from the tire testing device after the second phase may be carried out at atmospheric pressure in each case.

Here, work can typically be carried out at negative pressure such that, during the first measurement phase, negative pressure is generated proceeding from atmospheric pressure and said negative pressure is increased over the measurement phase. Then, the negative pressure is reduced again during the second measurement phase, typically back to atmospheric pressure. Accordingly, the pressure chamber can be a negative pressure chamber. However, exemplary embodiments that operate using positive pressure are also conceivable.

Here, according to an aspect of the disclosure, it is not necessary for generating the phase images to extend over the entire change in pressure. By way of example, the first phase image of the first measurement phase can be generated only after a certain change in pressure has been undertaken. Conversely, it is also possible for the last phase image of the second measurement phase to be generated and for a change in pressure to still be undertaken thereafter.

In particular, the first measurement phase therefore may only set in after a change in pressure in relation to the initial pressure in the pressure chamber was undertaken and/or wherein the second measurement phase ends before the pressure in the pressure chamber has returned to the initial pressure.

Such an offset of the measurement phase or measurement phases in relation to the initial pressure may reduce interfering influences.

However, in an exemplary embodiment, the first phase image during the first phase and the last phase image during the second phase are generated at atmospheric pressure.

The more similar the pressure profiles are during the first phase and during the second phase, the better interfering influences, which are based on vibrations, can be compensated by the summation over both phases.

Therefore, an exemplary embodiment of the present disclosure provides for the change in pressure during the second measurement phase to be effectuated with an average speed which deviates by at most 20% and typically by at most 10% from the average speed of the change in pressure during the first measurement phase.

Furthermore, an exemplary embodiment of the present disclosure provides for the first phase image during the first phase and the last phase image during the second phase to be recorded at the same pressure.

However, according to an exemplary embodiment of the present disclosure, the change in the pressure during the second measurement phase is effectuated more quickly than the change in the pressure during the first measurement phase. By way of example, there can be quick venting or quick aerating of the pressure chamber during the second measurement phase.

This takes account of the fact that many commercially available devices have such a structural design that the negative pressure during the first phase increases more slowly than it falls during the second phase. The present disclosure can also be applied in the case of these devices. If the pressure profile is maintained in the process, a software update is all that is required.

If the pressure during one of the two measurement phases changes more quickly than in the other measurement phase, this measurement phase typically includes a portion during which the pressure does not change. As a result, the otherwise present difference in the time duration of the measurement phases can be reduced.

However, provision is also made for the change in the pressure during the second measurement phase to be effectuated in symmetrical fashion with respect to the change in the pressure in the first measurement phase. As a result, it is possible to compensate to the best possible extent interfering influences that are based on vibrations.

In a further exemplary embodiment of the present disclosure, provision is made for a plurality of successive first and second measurement phases. Typically, a summation is effectuated here over the partial phase difference phase images from all measurement phases for the purposes of producing the overall phase difference image. As a result, it is possible to reduce even further the change in pressure per measurement phase and hence the compressive strength of the tire testing device required overall.

Typically, the absolute pressure changes during a plurality of successive measurement phases have the same magnitude.

Typically, the successive first and second measurement phases form a periodic pressure profile. This once again reduces interferences in the test result which are based on vibrations.

In an exemplary embodiment of the present disclosure, provision is made for at least one phase image to include both a partial phase difference image from a first measurement phase and a partial phase difference image from a second measurement phase. In particular, a phase image can be generated at the transition between two measurement phases, said phase image being included in the last partial phase difference image of the measurement phase lying before the transition and in the first partial phase difference image of the phase lying after the transition. By way of example, a phase image may be generated at the end of the first phase, during which, e.g., maximum negative pressure or positive pressure prevails, said phase image being included in the last partial phase difference image of the first measurement phase and in the first partial phase difference image of the second measurement phase. If use is made of a plurality of successive first and second measurement phases, it is also possible for a phase image to be generated at the end of the second measurement phase, for example at minimal negative pressure or positive pressure, said phase image being included in the last partial phase difference image of the second measurement phase and in the first partial phase difference image of the first measurement phase.

In an exemplary embodiment of the present disclosure, provision is made for negative pressure to be generated in the pressure chamber during the first measurement phase, said negative pressure typically being released again during the second measurement phase. However, work may alternatively also be undertaken with positive pressure.

In an exemplary embodiment of the present disclosure, a whole-body deformation is eliminated from the phase images and/or partial phase difference images and/or the overall phase difference image. In addition, the whole-body deformation is determined from the overall phase difference image by filtering, said whole-body deformation then being subtracted from the overall phase difference image.

In an exemplary embodiment of the present disclosure, the partial phase difference images are phase filtered prior to the summation of the partial phase difference images. This increases the quality of the measurement results.

Typically, the phase images are captured a single measurement image. As a result, the phase images may also be captured while there is a change in the pressure in the pressure chamber and while the tire is consequently being deformed. By contrast, if a plurality of measurement images are required to generate a phase image, the pressure in the pressure chamber must be kept constant during the recording of the plurality of measurement images so as not to deform the tire.

Typically, a spatial phase shift is used for generating a partial phase difference image. Compared to a temporal phase shift, this is advantageous in that the partial phase difference image can be generated using only one measurement image.

Typically, an imaging optical unit is used to generate a measurement image, said imaging optical unit having a stop with at least one aperture, in particular one slit, and typically two apertures, in particular two slits, by which a spatial carrier frequency can be generated. This facilitates generating of the phase images from only one measurement image in each case. In particular, use can be made of a measurement arrangement as described in DE 198 56 400 A1, the content of which, in its entirety, is incorporated in the subject matter of the present application.

In an exemplary embodiment of the present disclosure, provision is made for the change in the pressure during the first phase and/or during the second phase to be effectuated continuously. The continuous change in pressure reduces induced vibrations. Typically, the course of the change in pressure during the first phase and/or during the second phase is substantially linear. However, in an exemplary embodiment, the first measurement phase or the second measurement phase may also include a portion during which there is no change in pressure.

In an exemplary embodiment of the present disclosure, provision is made for at least one of the phase images to be recorded while the pressure is changed. This facilitates a quick measurement routine.

Typically, the change in pressure during the tire test according to an aspect of the disclosure is less than 50 mbar, typically less than 40 mbar, further typically less than 30 mbar, further typically less than 20 mbar, further typically less than 10 mbar. As already described in more detail above, the procedure according to an aspect of the disclosure facilitates a reduction in the change in pressure during the individual measurement phases. As a result, the tire testing device becomes significantly cheaper since it only needs to be designed for a smaller pressure.

The present disclosure furthermore includes a tire testing device for testing a tire by interferometry, having a pressure chamber, at least one interferometric measuring head and a controller which is configured in such a way that it carries out a method as described above.

Typically, the testing device furthermore has an apparatus for modifying the pressure in the pressure chamber. By way of examples, it may include one or more pumps, valves, choke valves and/or flaps. In particular, use can be made of a reversing valve.

Furthermore, the controller typically undertakes an evaluation of the measurement results from the at least one measuring head and, in particular, an evaluation of the measurement images measured by the measuring head. The controller may be configured to capture phase images, to determine partial phase difference images and to generating an overall phase difference image.

In particular, the controller can carry out the following method steps:
- capturing phase images at different pressures in the pressure chamber by actuating the measuring head and the apparatus for changing the pressure in the pressure chamber;
- generating partial phase difference images between successive phase images; and
- summing the partial phase difference images to form an overall phase difference image.

Here, the controller changes the pressure in the pressure chamber in a first direction during a first measurement phase and changes the pressure in the pressure chamber in the opposite direction during a second measurement phase. Furthermore, at least one partial phase difference image from the first measurement phase and at least one partial phase difference image from the second measurement phase are included in the summation, undertaken by the controller, for generating the overall phase difference image.

Typically, the method for testing the tire is carried out in such a way as already explained in more detail above.

Typically, the controller carries out the method automatically.

The controller typically includes a microprocessor and a memory, in which control software is stored, said control software running on the microprocessor. The controller typically has a link via control lines and/or data lines to the measuring head and/or the apparatus for changing the pressure in the pressure chamber. Furthermore, the controller typically has an output unit and/or an output interface.

The measuring head is typically a shearographic measuring head. The measuring head may have a laser, in particular one or more laser diodes, an imaging optical unit and an image sensor, in particular a CCD sensor and/or a CMOS sensor.

The measuring head typically operates on the basis of a spatial phase shift. In particular, the measuring head may have an imaging optical unit, said imaging optical unit having a stop with at least one aperture, in particular one slit, and typically two apertures, in particular two slits, by which a spatial carrier frequency can be generated. This facilitates the generating of the phase images from only one measurement image in each case. In particular, use can be made of a measurement arrangement as described in DE 198 56 400 A1.

The present disclosure furthermore includes control software for a tire testing device, as described above. In particular the control software, if it is executed on a tire testing device, carries out a method as described above.

BRIEF DESCRIPTION OF THE DRAWINGS

The disclosure will now be described with reference to the drawings wherein.

DESCRIPTION OF EXEMPLARY EMBODIMENTS

Figure 8:
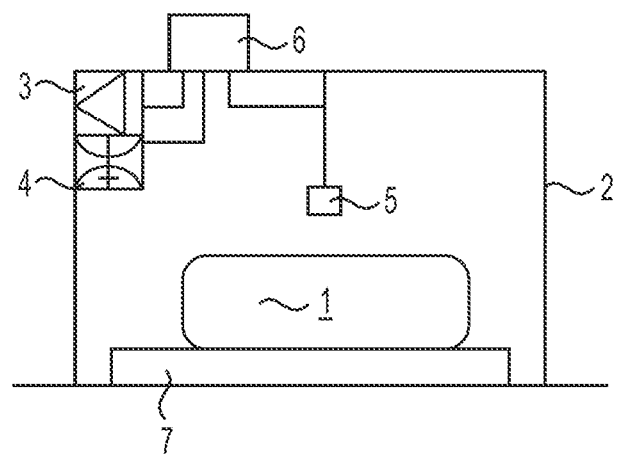
FIG. 8 shows a schematic diagram of a tire testing device according to an exemplary embodiment of the disclosure.

By way of example, the methods according to the exemplary embodiments of the disclosure may be carried out with the aid of a tire testing device as illustrated in a schematic diagram shown in FIG. 8. The tire testing device has a pressure chamber 2, into which the tire 1 is introduced for carrying out the test. To this end, the pressure chamber 2 has at least one opening, through which the tire can be introduced into the pressure chamber and/or be removed therefrom, said opening being sealable in an airtight manner. The tire testing device furthermore has an apparatus 3, 4, by which it is possible to change the pressure in the pressure chamber 2. By way of example, provision can be made for a pump 3, by which negative pressure is generated in the pressure chamber 2. Furthermore, provision can be made of an apparatus 4 for releasing the negative pressure, for example a valve, a choke valve, or a flap. In particular, use can be made of a reversing valve for the controlled change of the pressure in the pressure chamber. However, other apparatuses for changing the pressure in the pressure chamber 2 are also conceivable. Furthermore, work may also be carried out with positive pressure instead of with negative pressure.

The tire testing device furthermore has an interferometric measuring head 5, by which at least a portion of the surface of the tire can be tested. On account of the usually relatively small measuring field of the measuring heads, only a portion of the surface of the tire is usually tested during a testing process. Typically, a testing method according to an aspect of the disclosure is carried out for each portion to be tested of the surface of the tire. Depending on the configuration of the tire testing device, it is possible to move the measuring head and/or the tire in order to test different portions of the surface of the tire in succession. By way of example, the tire 1 may lie on a rotatable bearing 7 or the measuring head may be rotatable. Alternatively, a standing arrangement of the tire within the tire testing device is also conceivable.

The tire testing device furthermore has a controller 6, by which the apparatus 3, 4 for changing the pressure in the pressure chamber 2 and the measuring head 5 are actuated. The controller 6 furthermore serves to evaluate the data generated by the measuring head 5. The controller is configured in such a way that it carries out a method according to an aspect of the disclosure by an appropriate actuation of the apparatus for changing the pressure in the pressure chamber, by an actuation of the measuring head 5, and by an appropriate evaluation of the data generated. In particular, the controller carries out the method automatically in this case.

According to an exemplary embodiment of the disclosure, the pressure in the chamber is changed after introducing the tire 1 into the pressure chamber 2 in order to capture a sequence of phase images at different pressures in the pressure chamber. Now, partial phase difference images are determined from successive phase images, said partial phase difference images accordingly corresponding to a partial deformation of the tire between the production of the two phase images. The partial phase difference images are then summed to form an overall phase difference image.

Unlike methods according to the prior art, in which the pressure either rises or falls during the measurement phase, the method according to the exemplary embodiment of the disclosure includes two measurement phases, one with an increasing negative or positive pressure and one with a falling negative or positive pressure. At least one partial phase difference image is determined for the first measurement phase and at least one partial phase difference image is determined for the second measurement phase, said partial phase difference images are then summed with one another. In order to take account of the inverted pressure profile during the second measurement phase, the partial phase difference images generated therein are, however, included in the summation with the inverse sign to the partial phase difference images generated during the first measurement phases.

Figure 3:
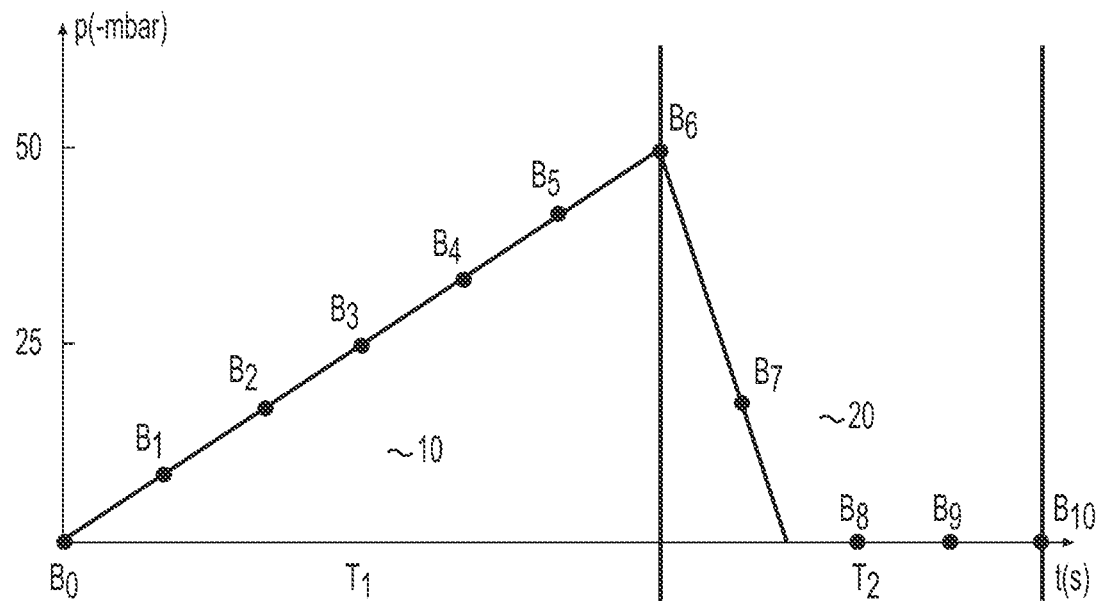
FIG. 3 shows the pressure profile and measuring points of a method according to a first exemplary embodiment of the disclosure.

FIG. 3 shows a first exemplary embodiment of such a method. Here, the negative pressure is increased during a first measurement phase 10, and said negative pressure is reduced again during a second measurement phase 20. The phase images $B_0$ to $B_5$ are generated during the first measurement phase, the phase image $B_6$ is generated in the overlap range between the first measurement phase and the second measurement phase and the phase images $B_7$ to $B_{10}$ are generated during the second measurement phase 20. The phase image $B_6$ consequently forms both the last phase image from the first measurement phase 10 and the first phase image from the second measurement phase 20.

A partial phase difference image $D_i = B_{i+1} - B_i$ is generated in each case from respectively successive phase images $B_i$ and $B_{i+1}$. These individual partial phase difference images $D_i$ are then summed, with the phase difference images $D_6$ to $D_9$ of the second measurement phase 20 being included in the summation with the opposite sign to the partial phase difference images $D_0$ to $D_5$ of the first measurement phase 10. This results in an overall phase difference image which includes both deformations of the tire during the first measurement phase and deformations of the tire during the second measurement phase.

As a result of measurements being undertaken during both rising and falling negative or positive pressure and as a result of these measurements being included in the overall phase difference image, the effective pressure change, and hence the effective deformation of the tire which is included in the overall phase difference image, doubles. The defects in the tire appear correspondingly clearer.

This can be used to reduce the changes in pressure used for testing the tire without impairing quality of the measurement result. Therefore, a tire testing device according to an exemplary embodiment of the disclosure can operate with a smaller positive or negative pressure and can therefore also be generated in a correspondingly more cost-effective manner since, in particular, the pressure chamber only needs to be designed for a smaller negative or positive pressure. Moreover, the components which are used for changing the pressure may have a simpler design.

Furthermore, the present disclosure also reduces the problems with vibrations since fewer vibrations are also excited on the tire on account of smaller changes in pressure. Furthermore, the method is accelerated since it is now possible to use the entire pressure profile for measurement purposes.

In the exemplary embodiment shown in FIG. 3, the phase images during the first measurement phase and during the second measurement phase are recorded after the same time interval in each case. Furthermore, the phase images for the first measurement phase are recorded over time period $T_1$ and the phase images for the second measurement phase are recorded over time period $T_2$, with the time duration $T_2$ of the second measurement phase being more than 50% and typically more than 80% of the time duration $T_1$ of the first measurement phase. As a result, there is at least a partial elimination of problems caused by vibrations, pressure points and whole-body deformations.

Figure 1:
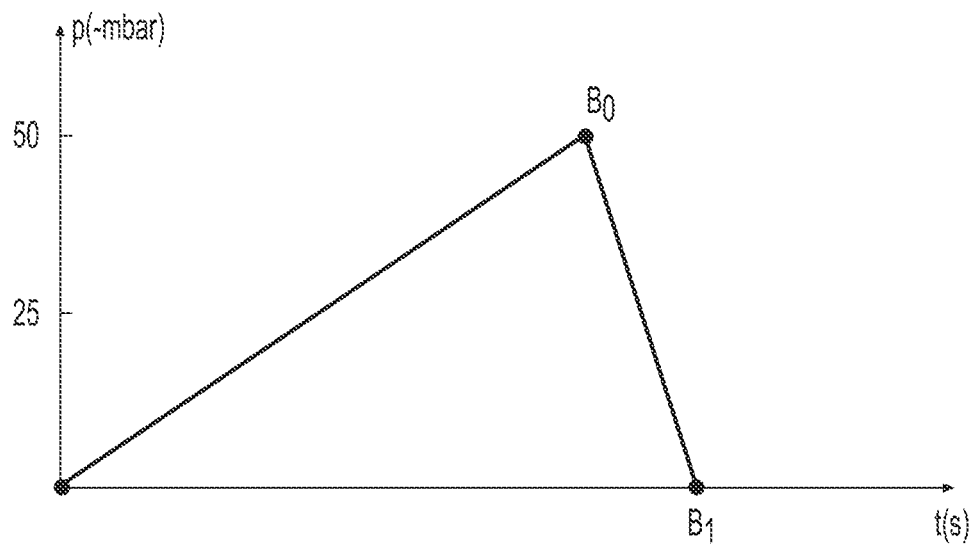
FIG. 1 shows a pressure profile and measuring points of a first testing method according to the prior art.
Figure 2:
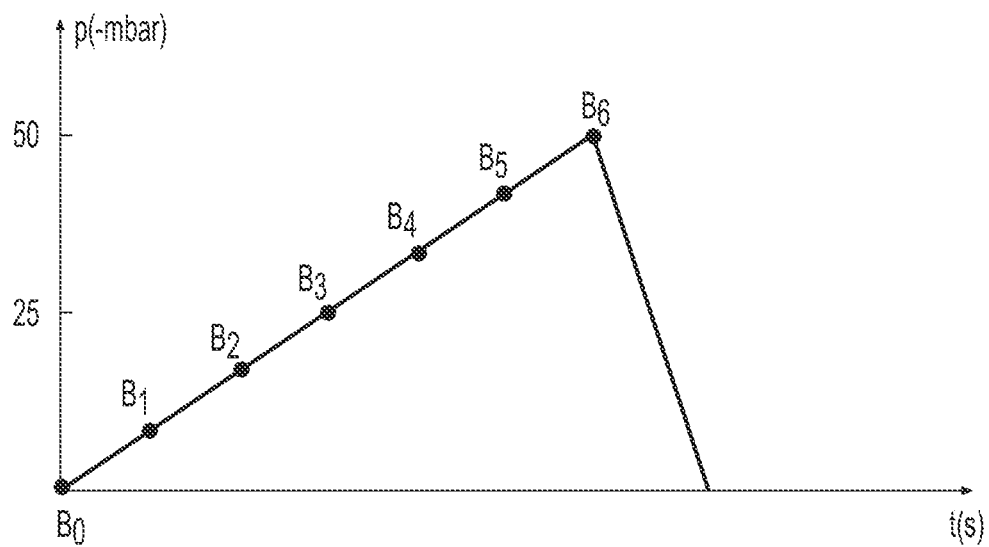
FIG. 2 shows the pressure profile and measuring points of a second testing method according to the prior art.

In the exemplary embodiment shown in FIG. 3, which builds on the pressure profile that is known from the prior art illustrated in FIG. 2, the pressure change in the first phase 10 is slower than in the second phase 20. This is the case in many devices according to the prior art, often caused by the mechanical structure of the apparatus, used therein, for changing the pressure in the pressure chamber. A method according to FIG. 3 therefore may be implemented by a software update without having to modify the mechanical structure of the device, even in the case of such apparatuses known from the prior art. As is clear from FIG. 3, this leads to a change in pressure only being carried out over a first portion of the second measurement phase 20. By contrast, there is no change in pressure anymore over a second portion. Therefore, the further phase images $B_9$ and $B_{10}$ no longer contribute to identifying a geometric change in the tire on account of faults of the tire. However, they contribute to reducing the problems caused by vibrations, pressure points and whole-body deformations.

Figure 4:
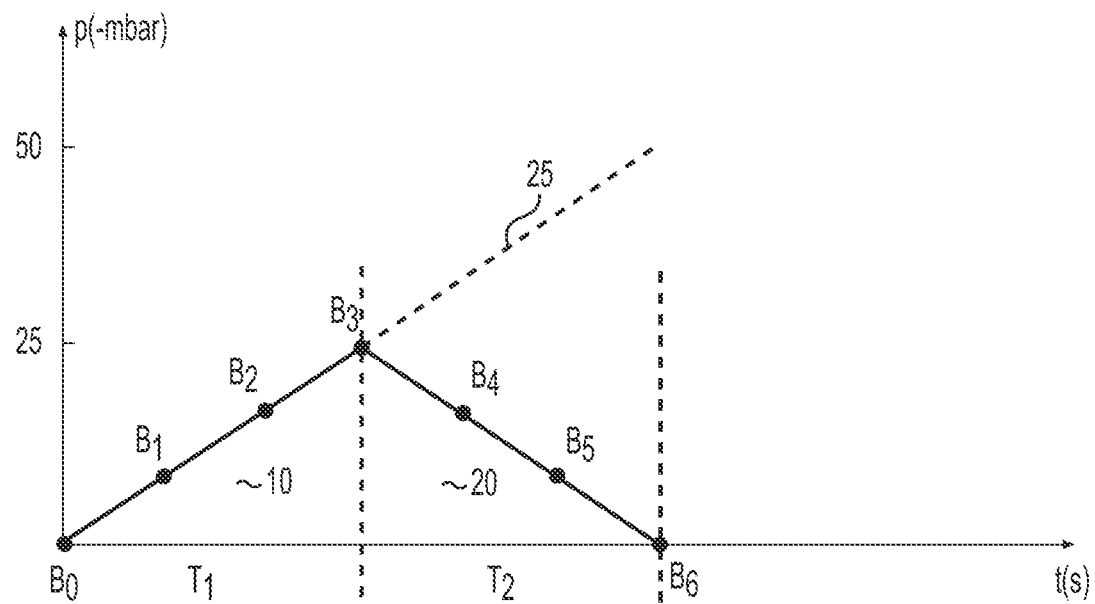
FIG. 4 shows the pressure profile and measuring points of a method according to a second exemplary embodiment of the disclosure.

However, the change in pressure during the first measurement phase 10 and during the second measurement phase 20 is typically symmetrical, as shown in the exemplary embodiment in FIG. 4. The symmetric configuration of the pressure profile during the first measurement phase and the second measurement phase is advantageous in that interfering effects which are based on vibrations are reduced in an even better way.

The phase images $B_0$ to $B_2$ are captured during the first measurement phase 10 in the exemplary embodiment shown in FIG. 4, the phase image $B_3$ is captured at the transition between the first phase 10 and the second phase 20 and the phase images $B_4$ to $B_6$ are captured during the second measurement phase 20, with the phase image $B_3$ captured at the transition between the first phase 10 and the second phase 20 again being used for both phases. As already described with regard to the first exemplary embodiment, partial phase difference images $D_i = B_{i+1} - B_i$ are now generated and summed from successive phase images, with the partial phase difference images from the second measurement phase 20 being included in the summation with an opposite sign.

The use of the opposite sign for the second measurement phase 20 leads to the partial phase difference images generated in said phase acting on the representation in the overall phase difference image of the deformations generated by faults in the tire in such a way as if the pressure were to continue to rise during the second measurement phase and were to correspond to the line 25 plotted in a dashed manner in FIG. 4 (this applies at least if the assumption of a linear relationship is made between the pressure and the deformation of the tire). Since this doubles the overall effect, the magnitude of the change in pressure can be reduced correspondingly, as shown in FIG. 4. By contrast, since the effects caused by vibrations, pressure points and whole-body deformations are independent of pressure, the opposite sign for the first measurement phase and the second measurement phase leads to a mutual reduction of these influences.

Figure 5:
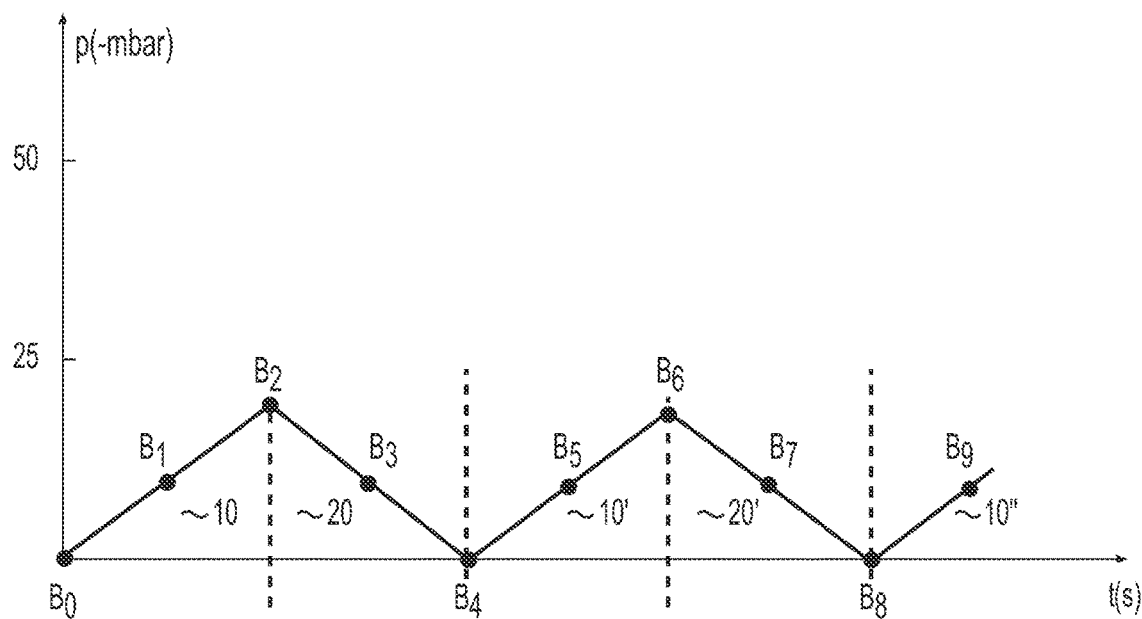
FIG. 5 shows the pressure profile and measuring points of a method according to a third exemplary embodiment of the disclosure.

According to an exemplary embodiment of the disclosure, it is also possible to use a plurality of successive first measurement phases and second measurement phases, as shown in the third exemplary embodiment in FIG. 5.

Following a first measurement phase 10 with rising negative pressure and a second measurement phase 20 with falling negative pressure there is a further first measurement phase 10' with rising negative pressure and then further second measurement phase 20' with falling negative pressure. Further first measurement phases 10" and further second measurement phases 20" may follow.

Typically, the same pressure profile is selected for all first measurement phases 10, 10', 10" and the same pressure profile is also selected for all second measurement phases 20, 20', 20" such that, overall, this typically results in a periodic profile of the pressure. Typically, the pressure profile between the first measurement phases and the second measurement phases is once again symmetrical.

The phase images and partial phase difference images are, in this case too, generated in the same manner as already described above for the first measurement phases and second measurement phases. Furthermore, here too, the partial phase difference images from the second measurement phases 20, 20' are included in the summation with the opposite sign to the partial phase difference images from the first measurement phases 10, 10', 10".

In the exemplary embodiment shown in FIG. 5, a phase image is captured and recorded, in each case, at a maximum and a minimum pressure, i.e., at the start and end of the measurement and in the overlap regions of the first and second measurement phases, with the phase images $B_2$, $B_4$, $B_6$, and $B_8$ captured and recorded in the overlap regions of the first and second measurement phases being included in each case both in the last phase difference image of the preceding measurement phase and in the first phase difference image of the subsequent measurement phase. Then, only one intermediate phase image $B_1$, $B_3$, $B_5$, $B_7$, and $B_9$ still is captured and recorded within the individual measurement phases, and so only two partial phase difference images are determined per measurement phase.

The effective overall pressure change included in an overall difference image is increased by the use of a plurality of first and second measurement phases in the case of the same pressure change per measurement phase. Accordingly, the change in pressure per measurement phase can be correspondingly reduced in the case of an unchanging or even increasing quality of the tire test.

While changes in pressure in the region of 50 mbar are conventional according to the prior art, the method according to the disclosure allows smaller changes in pressure. By way of example, work may be carried out with pressure changes that are less than 30 mbar, typically less than 20 and more typically less than 10 mbar. To this end, it is only necessary to use correspondingly many first and second measurement phases and sum the corresponding partial phase difference images.

In the exemplary embodiments shown in FIGS. 3 to 5, a plurality of partial phase difference images are generated per measurement phase in each case. However, the smaller the pressure changes per measurement phase are, the fewer partial phase difference images are required per measurement phase. Accordingly, it is likewise conceivable to generate only one partial phase difference image per measurement phase. In this case, it is only necessary to captured a phase image at, respectively, the start and end of each measurement phase or at, respectively, a minimum and a maximum pressure, and a partial phase difference image must be formed therefrom. Therefore, it is only necessary to capture a phase image at, respectively, the start and the end of the measurement and the transition between a first phase and a second phase or between a second phase and a first phase.

The change in pressure is typically continuous during the individual measurement phases. In particular, use can be made here of a substantially linear pressure profile. However, as illustrated in FIG. 3, this is not mandatory.

In the exemplary embodiments shown in FIGS. 3 to 5, the first phase image of the first measurement phase and the last phase image of the second measurement phase are respectively captured and recorded at ambient pressure. As a result, the entire time interval over which the pressure in the pressure chamber is changed can be used as part of a measurement phase.

Figure 6:
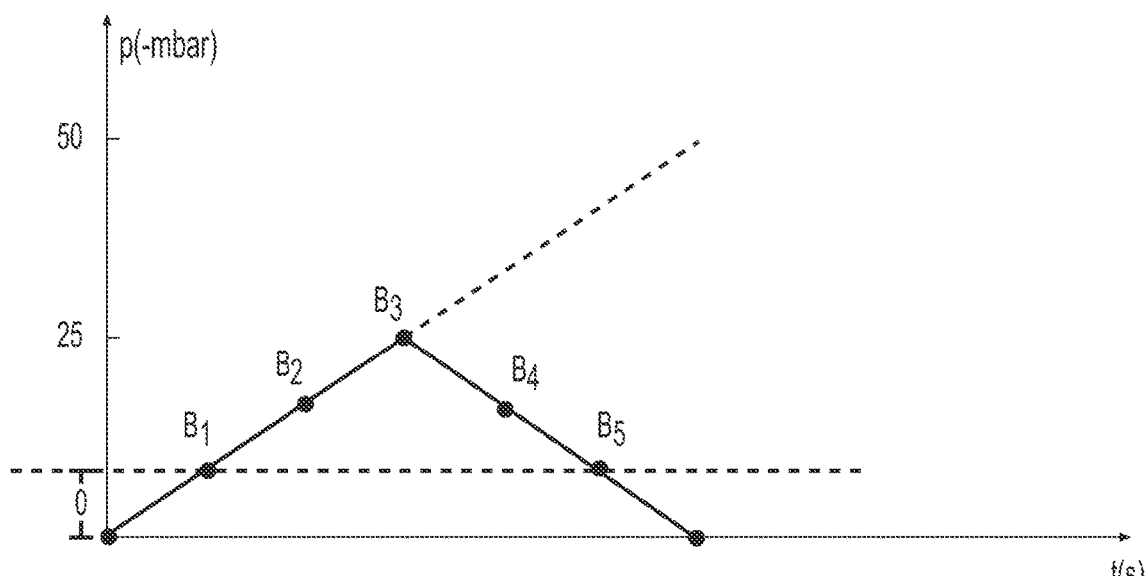
FIG. 6 shows the pressure profile and measuring points of a method according to a fourth exemplary embodiment of the disclosure.
Figure 7:
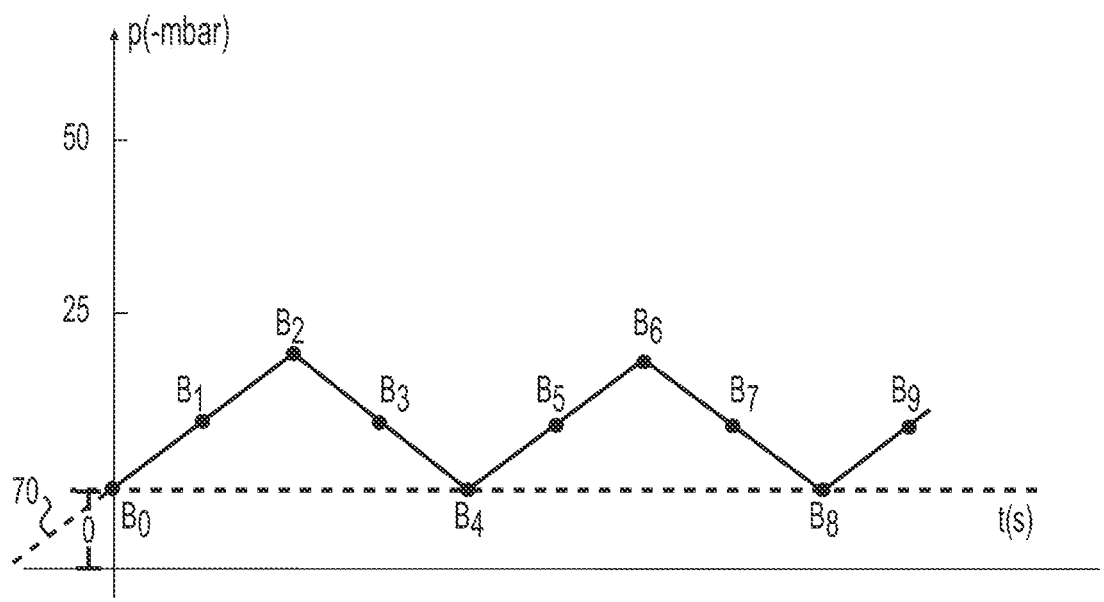
FIG. 7 shows the pressure profile and measuring points of a method according to a fifth exemplary embodiment of the disclosure.

However, alternatively, the testing method may also operate with an offset, as shown in FIGS. 6 and 7. To this end, the pressure in the pressure chamber is initially changed by an offset O from an initial pressure, which is usually the ambient pressure and hence atmospheric pressure, before the first measurement phase 10 sets in with a first measurement image. In the same way, the second measurement phase may end with the capturing and recording of the last phase image when the offset O is reached.

The exemplary embodiment shown in FIG. 6 corresponds to the procedure known from FIG. 4, with, however, the phase image $B_1$ being used as a first image of the first measurement phase and the phase image $B_5$ being used as the last phase image of the second measurement phase. As a result, an offset O arises for both measurement phases.

By contrast, the exemplary embodiment shown in FIG. 7 corresponds to the procedure known from FIG. 5, wherein, however, a pressure change 70 by the offset O is already undertaken before the first measurement phase. Then, the pressure is changed between the offset O and the maximum pressure in the individual measurement phases.

Within the scope of the present disclosure, shearography is typically used as interferometric measurement method since it is particularly suitable for the severe industrial conditions usually present when testing tires.

Typically, the individual phase images are generated, according to an exemplary embodiment of the disclosure, from a single measurement image. This is advantageous in that there is no need to stop the change in pressure for producing a phase image. Instead, the phase images may also be generated during the change in pressure, optionally at a high frequency.

Typically, the coherent radiation reflected by the tire is imaged onto an image plane by an imaging optical unit for the purposes of capturing the phase images, a sensor being located in said image plane, wherein reference radiation generated according to the shearing method is superposed on the sensor and the phase of the radiation is determined from the measurement signals of the sensor. To this end, the measuring head typically operates on the basis of a spatial phase shift.

Typically, the imaging optical unit has a stop with at least one aperture, in particular a slit. Typically, the stop has two apertures, in particular two slits. As a result, it is possible to generate a spatial carrier frequency such that it is possible to generate a phase image from only one measurement image. By way of example, the sensor is a charge-coupled device (CCD) sensor and/or a complementary metal-oxide-semiconductor (CMOS) sensor. The imaging optical unit can be configured and the measurement can be effectuated as described in DE 198 56 400 A1. The content of DE 198 56 400 A1 is incorporated, in its entirety thereof, in the subject matter of the present application.

Furthermore, the individual partial phase difference images can be subjected to phase filtering before they are summed. A better coherence relation and a better phase image quality emerge from phase-filtering the individual partial phase difference images.

Furthermore, it is possible, according to an exemplary embodiment of the disclosure, to eliminate or reduce the whole-body deformation or the influences thereof on the overall phase difference image. Furthermore, it is possible to eliminate or reduce the local deformation on account of pressure points and the deformation on account of vibrations or the influences thereof on the overall phase difference image. In particular, this is effectuated by the summation over the second measurement phase with an opposite sign.

Reducing the influences of a whole-body deformation can additionally be effectuated by corresponding processing of the phase images, the partial phase difference images and/or the overall phase difference image. By way of example, the overall phase difference image generated by the whole-body deformation can be ascertained from reference measurements or from filtering the overall phase difference image and may be subtracted from the overall phase difference image.

Furthermore, the phase images and the partial phase difference images can be generated and/or the summation can be effected as described in DE 101 01 057 A1. Therefore, the content of DE 10101057 A1, in its entirety, is also incorporated in the subject matter of the present application.

It is understood that the foregoing description is that of the exemplary embodiments of the disclosure and that various changes and modifications may be made thereto without departing from the spirit and scope of the disclosure as defined in the appended claims.

What is claimed is:

1. A method for testing a tire by interferometry in a pressure chamber of a tire testing device, the method comprising:
    capturing phase images at different pressures in the pressure chamber;
    generating partial phase difference images between successive phase images;
    summing the partial phase difference images to form an overall phase difference image;
    changing a pressure in the pressure chamber in a first direction during a first measurement phase;
    changing the pressure in a direction opposite to the first direction during a second measurement phase; and
    including at least one partial phase difference image from the first measurement phase and at least one partial phase difference image from the second measurement phase in the summing.

2. The method according to claim 1, further comprising:
    including a partial phase difference image or the partial phase difference images from the second measurement phase in the summing with an opposite sign.

3. The method according to claim 1, further comprising:
    generating at least two partial phase difference images; and
    including the at least two partial phase difference images in the summing during at least one of the first measurement phase and the second measurement phase.

4. The method according to claim 1, wherein a time duration of the second measurement phase is at least 50% of the time duration of the first measurement phase,
    wherein a time interval between generating successive phase images over the first measurement phase and the second measurement phase varies by at most 20% of the shortest time interval, and
    wherein the time interval is invariable for all phase images.

5. The method according to claim 1, further comprising:
    changing the pressure during the second measurement phase more quickly than during the first measurement phase; and
    venting or aerating the pressure chamber during the second measurement phase.

6. The method according to claim 1, further comprising:
    symmetrically changing the pressure during the second measurement phase relative to the changing of the pressure during the first measurement phase.

7. The method according to claim 1, further comprising:
    including a plurality of successive first and second measurement phases, wherein the plurality of successive first and second measurement phases forms a periodic pressure profile and/or absolute pressure changes of the plurality of successive first and second measurement phases have a same magnitude.

8. The method according to claim 1, wherein the first measurement phase starts only after the pressure in the pressure chamber changes relative to an initial pressure, and/or
    wherein the second measurement phase ends before the pressure in the pressure chamber returns to the initial pressure.

9. The method according to claim 1, wherein at least one phase image includes both the partial phase difference image from the first measurement phase and the partial phase difference image from the second measurement phase, and
    wherein a phase image is captured at a transition between two measurement phases, the phase image being included in a last partial phase difference image of a measurement phase lying before the transition and in a first partial phase difference image of a measurement phase lying after the transition.

10. The method according to claim 1, further comprising:
    generating a negative pressure in the pressure chamber during the first measurement phase, the negative pressure being released during the second measurement phase.

11. The method according to claim 1, further comprising:
    eliminating a whole-body deformation from the phase images and/or the partial phase difference images and/or the overall phase difference image, and
    phase filtering the partial phase difference images prior to the summing.

12. The method according to claim 1, further comprising:
    generating the phase images from a single measurement image;

generating the partial phase shift difference images by a spatial phase shift; and generating the single measurement image by an imaging optical unit, the imaging optical unit having a stop with at least one aperture configured to generate a spatial carrier frequency.

13. The method according to claim 1, further comprising:

continuously changing the pressure during a first phase and/or a second phase;

recording at least one of the phase images while the pressure is changing;

changing of the pressure during a tire test less than 50 mbar.

14. A tire testing device for testing a tire by interferometry, the tire testing device comprising:

a pressure chamber, at least one interferometric measuring head, and a controller configured to:

capture phase images at different pressures in the pressure chamber;

generate partial phase difference images between successive phase images;

sum the partial phase difference images to form an overall phase difference image;

change a pressure in the pressure chamber in a first direction during a first measurement phase;

change the pressure in a direction opposite to the first direction during a second measurement phase; and include at least one partial phase difference image from the first measurement phase and at least one partial phase difference image from the second measurement phase in the summing.

15. A non-transitory computer readable storage medium encoded with control software for a tire testing device according to claim 14.

* * * * *